(12) United States Patent
Hamzeh et al.

(10) Patent No.: US 8,073,895 B2
(45) Date of Patent: Dec. 6, 2011

(54) SYSTEM AND METHOD FOR DELIVERING WEB CONTENT TO A MOBILE DEVICE

(75) Inventors: Mehrak Hamzeh, Moraga, CA (US); Carlos Alfredo Lau, Vancouver (CA)

(73) Assignee: Globaltel Media, Inc., Encinitas, CA (US)

( * ) Notice: Subject to any disclaimer, the term of this patent is extended or adjusted under 35 U.S.C. 154(b) by 1000 days.

(21) Appl. No.: 10/859,409

(22) Filed: Jun. 1, 2004

(65) Prior Publication Data
US 2006/0031387 A1 Feb. 9, 2006

(51) Int. Cl.
*G06F 15/16* (2006.01)
(52) U.S. Cl. ........................................ 709/200
(58) Field of Classification Search ............ 709/200
See application file for complete search history.

(56) References Cited

U.S. PATENT DOCUMENTS

| | | | | |
|---|---|---|---|---|
| 2002/0111907 A1* | 8/2002 | Ling | | 705/41 |
| 2003/0069922 A1* | 4/2003 | Arunachalam | | 709/203 |
| 2003/0115365 A1* | 6/2003 | Lindsey | | 709/246 |
| 2003/0122922 A1* | 7/2003 | Saffer et al. | | 348/14.01 |
| 2003/0182626 A1* | 9/2003 | Davidov et al. | | 715/513 |
| 2004/0110462 A1* | 6/2004 | Forstadius | | 455/3.01 |
| 2004/0210587 A1* | 10/2004 | Reysa | | 707/100 |
| 2005/0149564 A1* | 7/2005 | Jain et al. | | 707/104.1 |

FOREIGN PATENT DOCUMENTS
EP 1418771 5/2004
\* cited by examiner

*Primary Examiner* — John Follansbee
*Assistant Examiner* — Maceeh Anwari
(74) *Attorney, Agent, or Firm* — Mintz, Levin, Cohn, Ferris Glovsky & Popeo, P.C.

(57) ABSTRACT

A system and method for delivery web content to a mobile device. A system includes a content delivery program associated with a webpage, where the webpage includes at least one content item. The content delivery program is configured to receive a user selection signal related to the at least one content item, receive an identifier of the mobile device, and initiate a delivery of the at least one content item to the mobile device based on the user selection signal and the identifier.

15 Claims, 5 Drawing Sheets

SYSTEM AND METHOD FOR DELIVERING WEB CONTENT TO A MOBILE DEVICE

BACKGROUND

In the Internet or World Wide Web ("web"), content is stored in servers and accessed by a client application such as a browser. Advances in wireless communication technology have led to a convergence of sorts, as now wireless subscribers can access and receive web content via a mobile device such as a cell phone. Wireless web access is typically done using a specialized browser application on the mobile device. The subscriber must subscribe to web services through a wireless service carrier.

Currently, in one way to download content, especially a picture, from the web to a mobile device, a user must locate a website which offers mobile content, find the desired picture, call a telephone number using their mobile device, and then type in a code. The picture then takes a few minutes to download to the mobile device. The subscriber gets billed directly on their carrier cell phone bill, in a practice known as "reverse billing."

In another way, a user locates a website that offers mobile content and dials a phone number provided by the website. Then the user sends a text message to that number along with a code number which then downloads the picture to cell phone. Reverse billing still occurs. In yet another way, a user can send text to a cell phone from a website. The user enters the cell phone number, types in a text message and clicks "send."

In still yet another method, a website developer can use a tool to create an application for sending to a cell phone a mobile version of the website's online content. These mobile applications are then offered to the mobile subscribers through the carrier's online portal or pre-installed in the cell phone itself. Website owners build mobile applications hoping that a carrier will accept the application through their particular network devices or online portal. However, not every website owner can get their mobile application made available from the carrier's website portal or device, and usually must build the separate mobile application for their content themselves.

Third, current solutions require a user/visitor/web surfer to locate a website that offers mobile content, find the media (picture, audio, vidlet, etc) then call a phone number using the cell phone that will receive the media and type in a code or send a text message which then downloads the media to cell phone. This solution shows up on carrier monthly bill to the cell phone user at a very high cost. The carrier takes a major portion of the proceeds and gives a small portion to the website owner or content provider offering the content.

SUMMARY

This document discloses a system and method for sending web content from a website to a mobile device. The web content can include a picture, a video clip, or other media. A system includes a content delivery program associated with a webpage, where the webpage includes at least one content item. The content delivery program is configured to receive a user selection signal related to the at least one content item, receive an identifier of the mobile device, and initiate a delivery of the at least one content item to the mobile device based on the user selection signal and the identifier.

Accordingly, the system allows a user to "click" on a selected content item in the webpage with a pointer or other mechanism, view a pop-up winder, and enter a cell phone number or other identifier, and click "send." The selected content item is sent automatically to the mobile device associated with the cell phone number. In an embodiment, the content delivery program is encoded in Java, and is provided to the webpage from a server as an applet. In another embodiment, the content delivery program is a servlet running on a server that hosts the webpage. The webpage is accessible by a user with the content delivery program pre-installed, and selected content items can be uploaded to the server for inclusion in the webpage.

The details of one or more embodiments are set forth in the accompanying drawings and the description below. Other features, objects, and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document discloses a system and method to enable any website to have a feature that allows a user to click on a picture or other content item and send it to any cell phone or other type of mobile device. Furthermore, the website sending the content can have its own sender identifier (ID) which allows the content owner website to get credit for sending the content.

Figure 1:
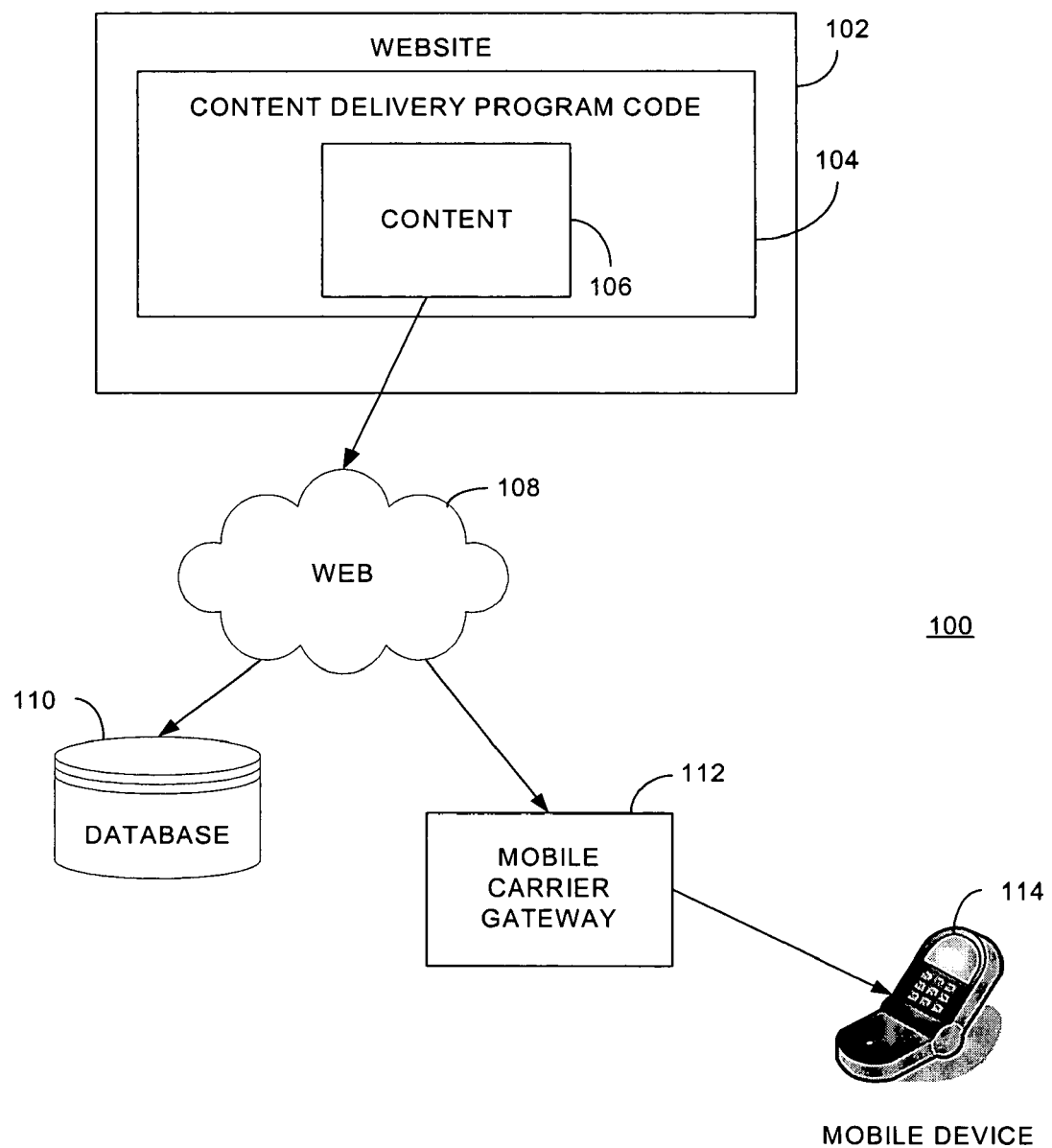
FIG. 1 is a block diagram of a system for delivering web content to a mobile device.

FIG. 1 is a block diagram of a system 100 for enabling delivery of web content 106 to a mobile device 114. In the system 100, a client computer 101 includes a browser application to access website data from the web 108 and display a webpage 102. The client computer 101 can be any type of computer with access to the web 108. The webpage 102 is associated with a website that includes one or more "pages" of content encoded in a markup language such as hypertext markup language (HTML) or extensible markup language (XML) that can be rendered by the browser application. The website 102 data includes content 106, such as pictures, text, video clips, graphics, promotional content, etc. The markup language defines how the content 106 is to be rendered in the webpage 102.

The data associated with the webpage 102 includes a content delivery program code 104. In an exemplary embodiment, the content delivery program code 104 is a Java applet that is applied to any content for which mobile delivery functionality is desired. The content delivery program code 104 is sent to the client computer 101 along with the webpage 102 and associated content 106. The content delivery program code 104 provides content delivery functionality to the content 106.

In one example, a website owner or administrator receives an applet over the web 108 from a server connected to the web 108. The website owner or administrator uses the applet code to enable selected content on their website to have mobile delivery functionality. In addition to receiving the applet, the website owner or administrator receives instructions for executing the applet, i.e. copying a number of files to their web server's root folder or other such steps. These files may be used to load the applet on the webpage or portions thereof.

In one implementation, the content delivery program code 104 allows a user to "click" on the rendered content 106, or otherwise provide a user selection signal, and invoke a program that is configured to package the content data in a transmittable format, along with other data such as a sender ID identifying the website and/or website owner/content originator, and deliver the data to a mobile device as will be explained further below. The content delivery program code 104 receives a recipient identifier, such as a cell phone telephone number, from the user. The content delivery program code 104 packages the recipient identifier and content data for transmission to the recipient represented by the recipient identifier.

In one exemplary embodiment, a user can send promotional content such as coupons and advertisements to one or more selected mobile devices. The promotional content can include a unique ID that distinguishes the promotional content type (i.e. coupon or advertisement, etc.), and other information such as an expiration date, issuer or originator of the promotional content, and in the case of coupons, redemption information. This other information can be sent with the promotional content and rendered on the mobile device.

In another exemplary embodiment, the content 106 can be a streaming audio or video source from a web server. When a user selects the content 106, the streaming audio or video data can be repackaged for streamed delivery to a mobile device that can accept the streamed data. In one example, the streamed data can be a webcast of a radio show, or a video feed of an event such as a sporting event.

The content delivery program code 104 causes the data representing the content 106 to be sent over the web 108 to a mobile carrier gateway 112 of any of a number of wireless service carriers. The content can be delivered to a single mobile device, or broadcast to a number of mobile devices, either in a sequence or simultaneously. The content data can also be sent to a database 110 for storage and/or processing. The mobile carrier gateway 112 sends the content data in a wireless format over a wireless network 113 for delivery to the mobile device 114. The mobile device 114 can be a cell phone, wireless personal digital assistant (PDA), or other device having a display and a local application for rendering and displaying the content data.

Figure 2:
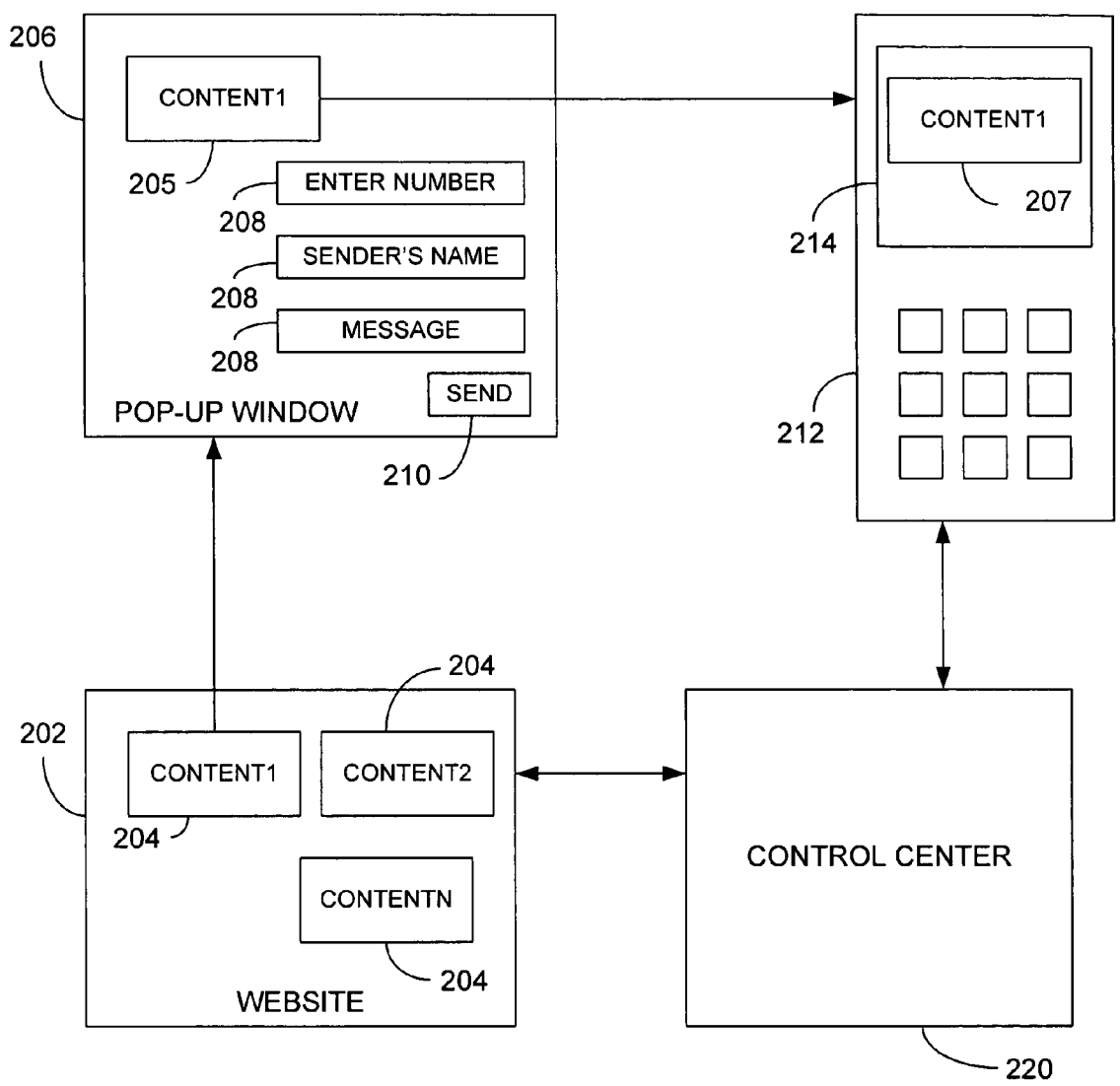
FIG. 2 is a functional block diagram of a technique for delivering web content to a mobile device.

FIG. 2 shows a functional block diagram of a system and process 200 for delivering web content 204 to a mobile device 212. A website 201 provides one or more webpages 202, which in turn includes one or more content items 204, each content item 204 representing a discreet item of content data such as a picture, a graphic, a unit of text, a video clip, etc. The content item 204 can be represented in the webpage 202 as a rendered picture, a hyperlink text, a box, or a graphic.

One or more of the content items 204 can be configured for delivery to a mobile device using the content delivery program code described in FIG. 1. In one exemplary embodiment, a user selects a content item 204 for delivery. The user can use a pointer or other graphical object to target the selected content item 204, and "click" on it via an input device such as a mouse or keyboard to invoke the content delivery program embedded in the webpage code. By so selecting, a pop-up window 206 is generated in a display containing the displayed webpage 202. The pop-up window 206 can appear inside the webpage 202 on the user's display, or outside the browser application window that contains the webpage 202.

The pop-up window 206 can include a representation of the selected content 205, such as a thumbnail or other type of representation of the selected content data from the content item 204. The pop-up window 206 can also include a number of input fields 208 for receiving user input, including but not limited to, a recipient identifier such as a cell phone number, the sender's name or other identifier, a message to be delivered to the recipient or for storage in a database, or other information. The user may deliver the selected content 205 to one or more recipients, either by entering one or more recipient identifiers in the pop-up window, or by repeatedly selecting the content item 204 to be delivered. The pop-up window 206 also includes an action control 210 such as a graphical "send" button, for activating a delivery process of the selected content item 204 as indicated in the selected content representation 205.

The delivery process sends the content data and other information to a mobile device 212 as selected by the user. The mobile device includes a display 214 capable of viewing the content data 207. In some implementation, the wireless version of the content data 207 is a compressed or smaller version of the content data that defines the object 204 in the webpage 202, due to technical constraints or limitations of the display 214.

A control center 220 monitors the traffic of communications of the system 200, including the sending of content data from one or more websites 201 to one or more mobile devices 212, for quality of service (QoS), billing and other controls functions. The control center 220 can be implemented as a program running on a client computer, or as a web-based server application. From the control center 220, the website owner can edit the name of the company or person from which the content originated, or from which the content is provided for delivery. For example, there can be a default setting, such as "GTM" (i.e. for GlobalTel Media), that indicates the provider of the delivery service for the content. The website owner can decide to upgrade his account, and can attach their own name to deliveries. In one implementation, a fee can be charged for allowing the website owner or content originator to provide their name to delivered content.

In accordance with implementations described herein, a bill in conjunction with delivering content does not show up the carrier's billing statement, i.e. reverse billing is not used. Depending on whether the website owner decides to allow free content delivery or will charge for it depends on the specific website owner. If the website owner wants to charge their customers for mobile content delivery, then that customer can sign up for and be issued an account number. The account number is associated with an account that can be a private label account, or associated with the website owner or the customer/recipient.

In one embodiment, the account number is associated to an account the first time a customer pays for mobile content delivery. The user/visitor can charge up their account with credits by paying for it through the control center 220. There can be a rate sheet available for the user/visitor to select how many and how much content credits to purchase. The user/visitor can then enters the account number into a field 208 of the pop-up window 206, along with the cell phone number and a text message in other fields 208. The credits are then debited from that account number and automatically credited to the appropriate website owner. Thus the debit/credit transaction is facilitated through identification and association of the user/visitor sending the mobile content and the website owner offering the mobile content. Everything can be tracked in the control center 220. Alternatively, the website owner offers the mobile content as a complimentary service. The website owner may have their own account number which will get debited every time one of their website visitors sends mobile content to a mobile device.

Figure 3:
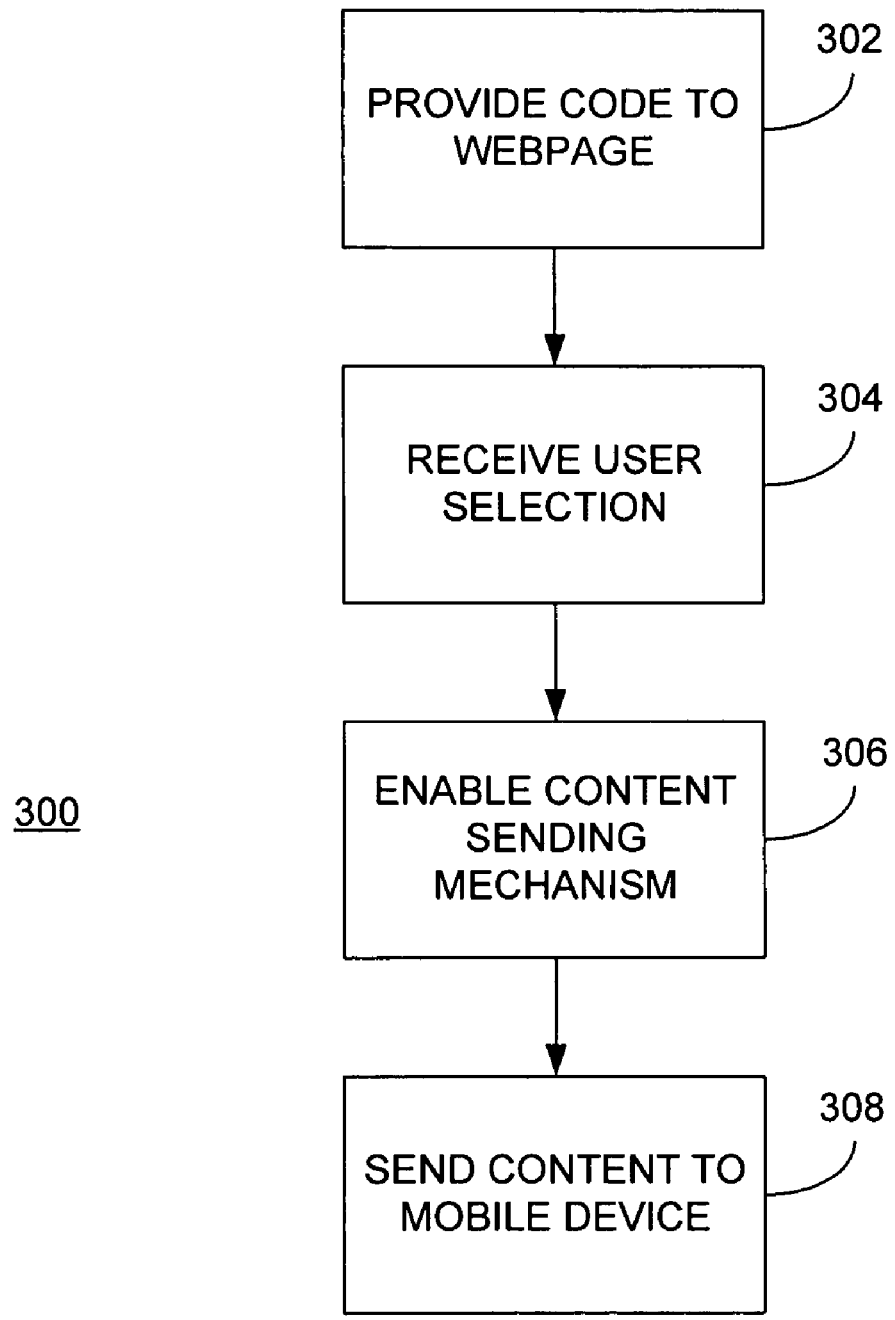
FIG. 3 is a flowchart of a method for enabling delivery of web content to a mobile device.

FIG. 3 is a flowchart of a method 300 for delivering web content to a mobile device. In accordance with an exemplary embodiment, the method 300 includes providing content delivery program code to the website at step 302. The website and its content are delivered to a client in the form of code according to a markup language, such as HTML or XML. The content delivery program code can be embedded in the markup language to further define the content therein. At 304, user selection input is received, such as when a user clicks on a content item displayed in a browser according to its markup language instructions, for example. At step 306, the content delivery is enabled by, for example, invoking the content-sending delivery code to prompt the rendering of an interactive pop-up window, as explained in further detail below.

The content delivery mechanism sends the content to one or more mobile devices, at step 308. In one embodiment, a user enters a telephone number of a cell phone to deliver the content to a mobile device subscriber. In an another embodiment, the user can enter multiple telephone numbers for a broadcast of the selected content.

Figure 4:
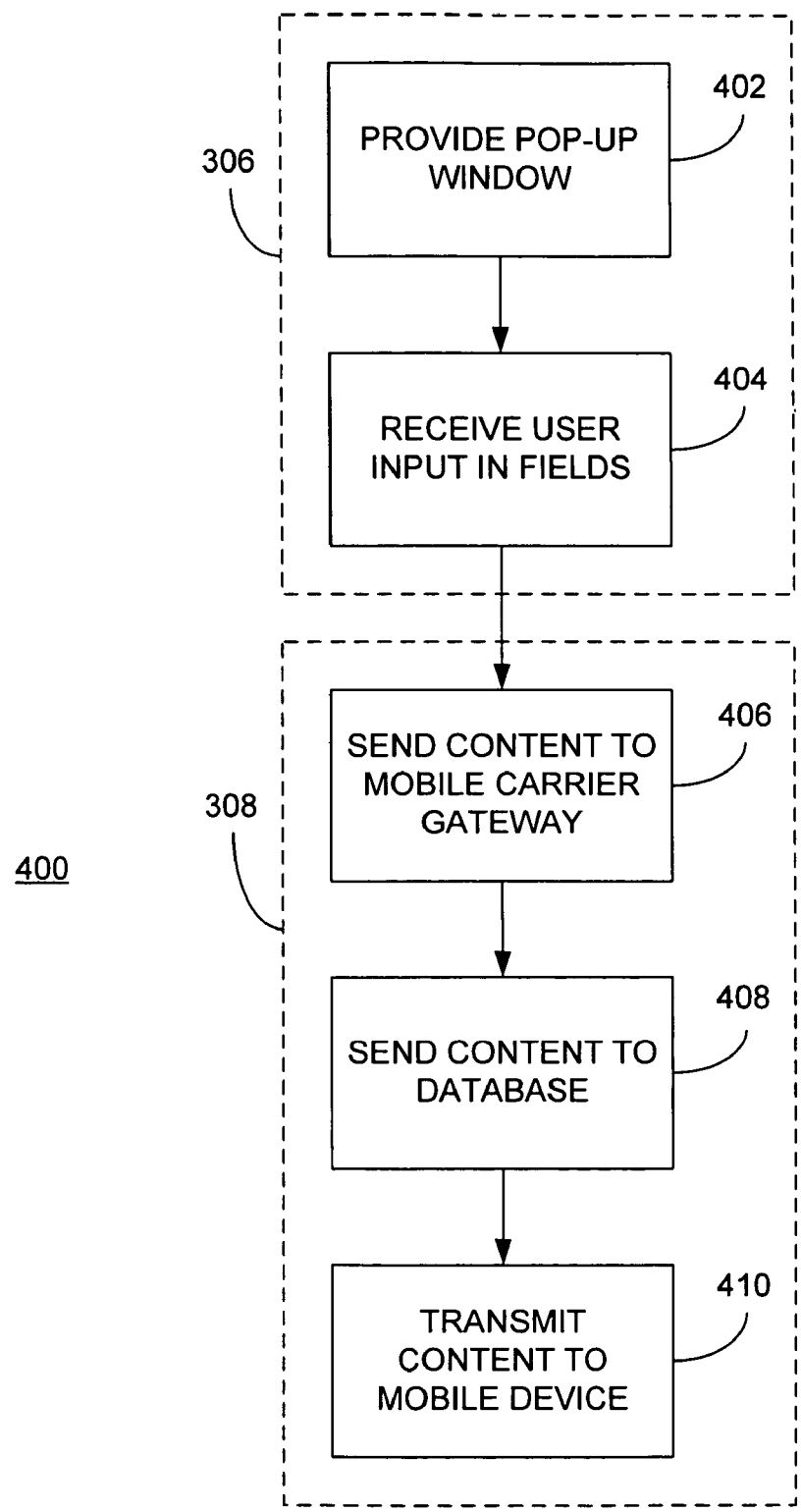
FIG. 4 is a flowchart of a method for delivering web content to a mobile device.

FIG. 4 shows a method 400 of delivering web content to a mobile device. The step 306 described with reference to FIG. 3 includes steps of providing a pop-up window at step 402 and receiving user input at step 404. The pop-up window can include one or more user input fields for receiving user input, via an input device such as a keyboard or mouse, that may include a recipient ID, a message, a sender ID, or other information. These fields can be populated by a user at step 404, and the data in the fields can be processed for delivering the content to the appropriate mobile device. The decision whether or not to broadcast a sending of the content can be made in a user-selectable control within the pop-up window.

The step 308 of sending mobile content in FIG. 3 may be accomplished by the steps of sending the web content, or variant thereof, to a mobile carrier gateway at step 406. The web content data can also be sent to a database at step 408. The gateway can be a device or system for connecting to a carrier's wireless network, to which the mobile device is connectible and from which a subscriber can subscribe to mobile wireless services. At step 410, the content data and related information such as sender ID are transmitted from the mobile carrier gateway over the wireless network to the mobile device.

Figure 5:
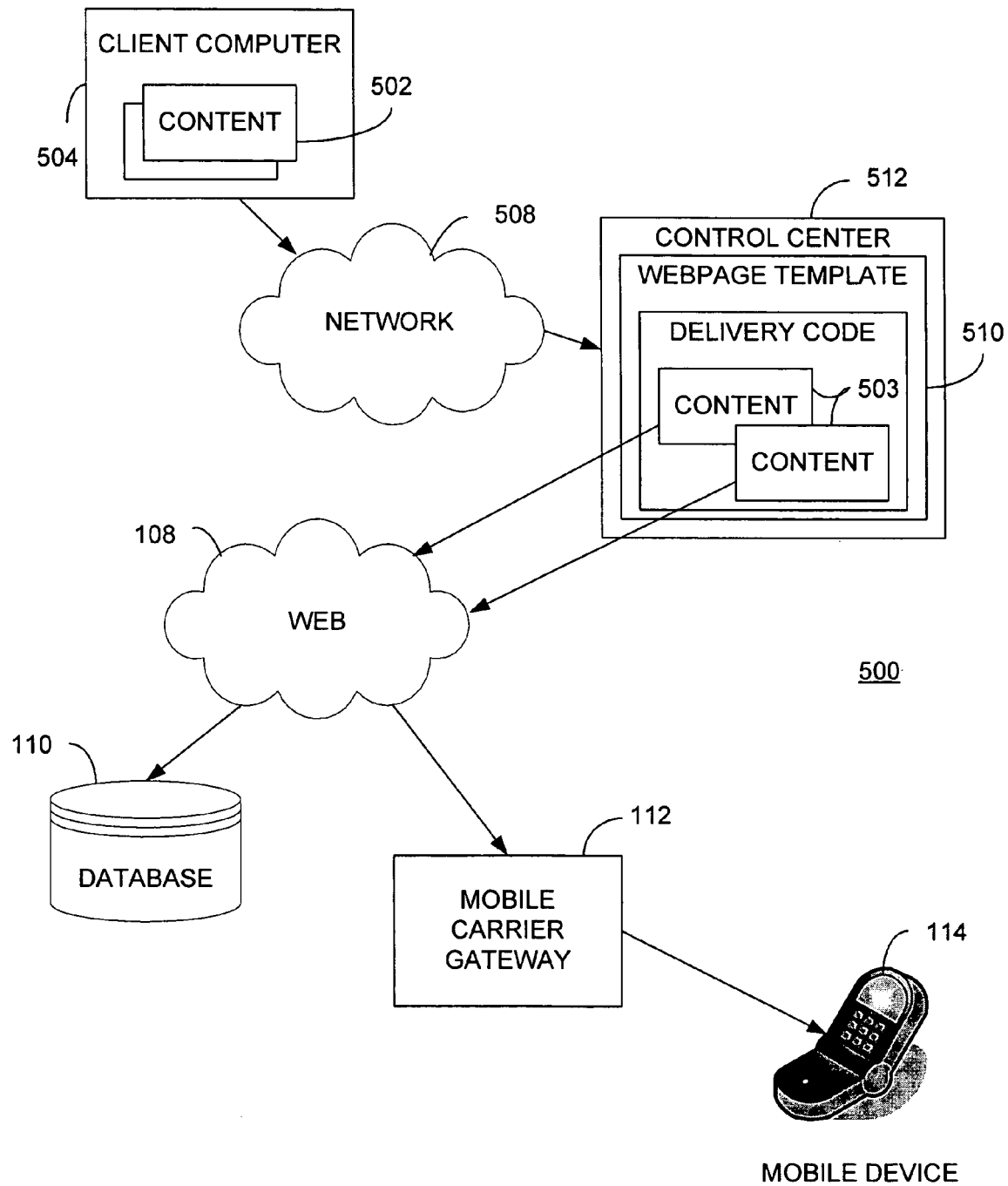
FIG. 5 is a block diagram of a system for delivering content to a mobile device.

FIG. 5 shows another embodiment of a system 500 illustrating an alternative technique for delivering content to a mobile device. Content 502 on any client computer 504 can be selectively uploaded to a control center 512 over a network 508. The network 508 may be part of the web 108, or may be any other type communications network suitable for transmitting content, such as a local area network (LAN), intranet, wide area network (WAN), etc. The selected content 502 is uploaded to the control center 512, which may be a server computer or other computing device. The control center 512 hosts a webpage template 510 that includes pre-installed content delivery program code 514 to provide content delivery functionality to the selected content 502. The content delivery program code 514 is preferably an applet or servlet running inside of a web server that comprises the control center 512.

Selected content 502 becomes enabled content 503 for delivery to a mobile device 114 through the web 108 and mobile carrier gateway 112 as described above. Accordingly, users can "publish" content, such as logos, brand identities, pictures, videos, etc., to the hosted webpage template 510. Once the content 502 is published, a uniform resource locator (URL) or other identifier is issued to the user. The user can link to the URL from their browser or own webpage, and execute the content delivery techniques described above as if the content delivery functionality were already provided to their own webpage.

Access to the webpage template 510 can be protected by any of a number of security mechanisms, and may be granted access by a user according to a one-time payment or periodic subscription model.

Although a few embodiments have been described in detail above, other modifications are possible. The logic flows depicted in FIGS. 3 and 4 do not require the particular order shown, or sequential order, to achieve desirable results. Other embodiments may be within the scope of the following claims.

The invention claimed is:

1. A system for delivering web content to at least one mobile device, the system comprising:
   a client computer having a browser application for accessing and displaying web content, the at least one mobile device being remote to the client computer and in communication with the client computer over a network; and
   a webpage stored on a non-transitory computer-readable storage medium, the webpage being downloadable to the client computer for display at the client computer and including:
      one or more content items; and
      a content delivery program associated with at least one of the one or more content items, wherein the content delivery program, when executed by a processor of the client computer, provides operations comprising:
         receiving a user selection at the client computer designating the at least one of the one or more content items of the webpage as a selected content item,
         in response to the user selection, configuring the selected content item into a format deliverable to the at least one mobile device over the network and presenting a pop-up window at the client computer that is displayed inside the webpage, the pop-up window being associated with the selected content item and comprising:
            one or more fields for entering identifiers of the at least one mobile device,
            a field for entering a sender identifier designating an originator of the selected content item, and
            the selected content item; and
         sending the selected content item to the at least one mobile device, wherein:
            the sending includes sending content data associated with the selected content item to a mobile carrier gateway associated with the at least one mobile device via the network, and
            the sending is initiated without regard to billing the at least one mobile device.

2. A system in accordance with claim 1, wherein the content delivery program is an applet downloaded from a server for use with any of the one or more content items of the webpage once downloaded to the client computer.

3. A system in accordance with claim 1, wherein the webpage is stored on the non-transitory computer-readable storage medium on a server and the content delivery program is a servlet executed within the webpage.

4. A system for delivering web content to at least one mobile device, the system comprising:

a client computer containing one or more content items, the at least one mobile device being remote to the client computer and in communication with the client computer over a network;

a control center having at least one webpage template that includes a content delivery program for providing mobile delivery functionality to one or more content items of a webpage; and wherein at least one of the one or more content items, upon being uploaded to the control center by the client computer, is published to the at least one webpage template and deliverable over the network to the at least one mobile device, and wherein the content delivery program:

receives a user selection signal provided at the client computer that designates the at least one of the one or more content items published to the at least one webpage template as a selected content item;

generates, in response to the user selection signal, a pop-up window at the client computer that is defined in the at least one webpage template and associated with the selected content item, the pop-up window comprising:

one or more fields for entering identifiers of the at least one mobile device, a field for entering a sender identifier designating an originator of the selected content item, and the selected content item; and sends the selected content item to the at least one mobile device, wherein sending the selected content item includes sending content data associated with the selected content item to a mobile carrier gateway associated with the at least one mobile device via the network without regard to billing the at least one mobile device.

5. A system in accordance with claim 4, wherein the content delivery program includes a Java applet.

6. A system in accordance with claim 4, further comprising receiving and displaying the selected content item at the least one mobile device.

7. A system in accordance with claim 4, wherein the content delivery program is downloaded from a server to the at least one webpage template.

8. A method of delivering web content to at least one mobile device, the method comprising:

applying a content delivery program to one or more content items contained within a webpage to enable the one or more content items to be delivered over a network to the at least one mobile device, the content delivery program:

receiving a user selection signal provided at a client computer, the user selection signal designating at least one of the one or more content items as a selected content item;

in response to the user selection signal, generating a pop-up window at the client computer that is defined in the webpage and associated with the selected content item, the pop-up window comprising:

one or more fields for entering identifiers of the least one mobile device, a field for entering a sender identifier designating an originator of the selected content item, and the selected content item; and sending the selected content item to the at least one mobile device, wherein the sending includes sending content data associated with the selected content item to a mobile carrier gateway associated with the at least one mobile device via the network, and the sending is initiated without regard to billing the at least one mobile device; and receiving the selected content item at the at least one mobile device.

9. A method in accordance with claim 8, wherein providing the content delivery program to the webpage includes downloading an applet from a server to a browser executing a webpage code set of the webpage.

10. A method in accordance with claim 8, wherein providing the content delivery program to the webpage includes executing a servlet in a server that hosts a webpage code set of the webpage.

11. A method in accordance with claim 9, further comprising selecting the selected content item and executing the applet on the selected content item within the webpage code set of the webpage.

12. A method in accordance with claim 8, further comprising monitoring the delivery of the selected content item using the client computer.

13. A system for delivering web content to at least one mobile device, the system comprising:

a webpage stored on a non-transitory computer-readable storage medium and displayed in a browser on a computer connected to a network;

a mobile carrier gateway connecting the at least one mobile device to the network;

a content item associated with the webpage; and a content delivery program stored on the non-transitory computer-readable storage medium and associated with the webpage and the content item, the content delivery program designating the content item as a selected content item and sending the selected content item over the network and the mobile carrier gateway to the at least one mobile device, the content delivery program, in response to a user selection signal:

generating a pop-up window in the browser of the computer, the pop-up window being displayed within the webpage and associated with the selected content item and having one or more fields for entering identifiers of the at least one mobile device, one or more fields for entering identifiers designating one or more destinations for the selected content item, a field for entering a sender identifier designating an originator of the selected content item, and the selected content item; and sending the selected content item to the at least one mobile device, wherein:

the sending includes sending content data associated with the selected content item to a mobile carrier gateway associated with the at least one mobile device via the network, and the sending is initiated without regard to billing the at least one mobile device.

14. A system in accordance with claim 13, further comprising a control center connected to the network and receiving data from the content delivery program, wherein the control center tracks the delivery of the selected content item to the at least one mobile device.

15. A method of delivering web content, the method comprising:

receiving at a control center one or more content items from a client computer;

configuring the one or more content items with a content delivery program code to enable delivery of the one or more content items to at least one mobile device; and publishing the one or more content items configured with the content delivery program code to a webpage template, wherein the content delivery program code provides operations comprising:

receiving a user selection at the client computer designating at least one of the one or more content items of the webpage template as a selected content item, in response to the user selection, presenting a pop-up window at the client computer that is displayed inside the webpage template, the pop-up window being associated with the selected content item and comprising:

one or more fields for entering identifiers of the at least one mobile device, a field for entering a sender identifier designating an originator of the selected content item, and the selected content item; and sending the selected content item to the at least one mobile device, wherein:

the sending includes sending content data associated with the selected content item to a mobile carrier gateway associated with the at least one mobile device via a network, and the sending is initiated without regard to billing the at least one mobile device.

\* \* \* \* \*